(12) United States Patent
Milewski

(10) Patent No.: US 6,666,993 B2
(45) Date of Patent: Dec. 23, 2003

(54) SINGLE COMPONENT CALCIUM HALOPHOSPHATE PHOSPHOR

(75) Inventor: Peter Milewski, Bath, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/267,243

(22) Filed: Oct. 9, 2002

(65) Prior Publication Data

US 2003/0102461 A1 Jun. 5, 2003

Related U.S. Application Data

(62) Division of application No. 09/651,047, filed on Aug. 30, 2000, now Pat. No. 6,483,234.

(51) Int. Cl.$^7$ .............................. C09K 11/73

(52) U.S. Cl. ................ 252/301.4 P; 252/301.4 H

(58) Field of Search ............... 252/301.4 P, 301.4 H

(56) References Cited

U.S. PATENT DOCUMENTS 6,483,234 B1 * 11/2002 Milewski .................. 313/486

* cited by examiner

Primary Examiner—C. Melissa Koslow
(74) Attorney, Agent, or Firm—Ernestine C. Bartlett

(57) ABSTRACT

A single-component calcium halophosphate (ARTIC BRITE) Phosphor and a low pressure discharge lamp utilizing such a phosphor is provided having a lamp envelope having an inner surface, means within the lamp envelope for generating ultraviolet radiation; and a layer of a luminescent material adjacent the inner surface of the lamp envelope for generating visible light when impinged by the ultraviolet radiation. The phosphor material is at least one layer of a single-component calcium halophosphate phosphor having CIE color coordinates of X=346 and Y=359 and a CRI of at least 69, preferably a calcium halophosphate having the formula $Ca_{5-x-y}Sb_xMn_y(PO_4)_3Cl_zF_{1-x-z}$, wherein x is from about 0.032 to 0.037; y is from about 0.06 to 0.14; and z is about 0.025 to 0.05, derived from low cost, mined calcium carbonate, derived from a formulation that employs a high metals-to-phosphate (Ca+Mn) ratio of about 9.890 to achieve a friable phosphor cake resulting in less fines formation with a number average particle size of 6.3 μm.

9 Claims, 4 Drawing Sheets

FORMULATIONS

| TEST NO. | 78-1 | 78-2 | 78-3 | 78-6 | 79-1 | 79-2 | 79-3 | 79-4 | 82-1 |
|---|---|---|---|---|---|---|---|---|---|
| Ca + Mn | 9.89 | 9.89 | 9.89 | 9.89 | 9.89 | 9.89 | 9.89 | 9.89 | 9.89 |
| Mn | 0.095 | 0.095 | 0.085 | 0.105 | 0.125 | 0.115 | 0.115 | 0.125 | 0.17 |
| F2 | 0.925 | 0.875 | 0.875 | 0.875 | 0.775 | 0.775 | 0.825 | 0.825 | 0.92 |
| Cl2 | 0.13 | 0.18 | 0.18 | 0.18 | 0.27 | 0.27 | 0.22 | 0.22 | 0.128 |
| Sb2 | 0.063 | 0.063 | 0.063 | 0.063 | 0.063 | 0.063 | 0.063 | 0.063 | 0.06 |

| TEST NO. | 83-1 | 83-2 | 83-3 | 83-4 | 84-1 | 84-2 | 84-3 | 84-4 | 84-5 | T-85 |
|---|---|---|---|---|---|---|---|---|---|---|
| Ca + Mn | 9.89 | 9.89 | 9.89 | 9.89 | 9.89* | 9.89* | 9.89* | 9.89* | 9.89* | 9.890 |
| Mn | 0.13 | 0.13 | 0.13 | 0.13 | 0.128 | 0.128 | 0.142 | 0.142 | 0.128 | 0.142 |
| F2 | 0.9 | 0.88 | 0.88 | 0.9 | 0.882 | 0.882 | 0.905 | 0.905 | 0.882 | 0.904 |
| Cl2 | 0.15 | 0.17 | 0.175 | 0.155 | 0.168 | 0.168 | 0.145 | 0.145 | 0.168 | 0.146 |
| Sb2 | 0.06 | 0.06 | 0.055 | 0.055 | 0.06 | 0.06 | 0.06 | 0.06 | 0.06 | 0.062 |
| | *BATH CA | *MINED CA | *BATH CA | *MINED CA | *BATH CA | *MINED CA | | | | |

FIG. 5

| SAMPLE | %Sb | X | Y | %BRIGHTNESS* |
|---|---|---|---|---|
| 78-1 | 0.79 | 317.5 | 351.5 | 99.8 |
| 78-2 | 0.76 | 320.5 | 348.5 | 96.2 |
| 78-3 | 0.79 | 314 | 340 | 95.3 |
| 78-6 | 0.81 | 322.5 | 350.5 | 97.1 |
| 79-1 | 0.96 | 346 | 349.5 | 95.1 |
| 79-2 | 0.85 | 342.5 | 347 | 93.8 |
| 79-3 | 0.93 | 337.5 | 349 | 96.7 |
| 79-4 | 0.83 | 340.5 | 350 | 97.4 |
| 82-1 | --- | 361 | 379 | 106.6 |
| 83-1 | 0.77 | 342 | 360 | 101.1 |
| 83-2 | 0.76 | 348 | 359 | 100 |
| 83-3 | 0.77 | 345 | 356 | 98.4 |
| 83-4 | 0.72 | 343 | 358 | 100.5 |
| 84-1 | 0.66 | 344 | 359 | 93.9 |
| 84-2 | 0.69 | 347 | 360 | 93.5 |
| 84-3 | 0.66 | 350 | 366 | 95.3 |
| 84-4 | 0.67 | 348 | 367 | 95.8 |
| 84-5 | 0.65 | 343 | 361 | 93.9 |
| T-85 | 0.78 | 343.7 | 364.9 | 101.5 |
| MH736 | 0.79 | 343.5 | 361.8 | 100.4 |

*COMPARED TO M4736

FIG. 6

SINGLE COMPONENT CALCIUM HALOPHOSPHATE PHOSPHOR

This is a divisional of application Ser. No. 09/651,047, filed Aug. 30, 2000, now U.S. Pat. No. 6,483,234.

FIELD OF THE INVENTION

This invention relates to an improvement in electric lamps having a lamp envelope with a phosphor coating, and more particularly to a fluorescent lamp comprising a single-component phosphor.

BACKGROUND OF THE INVENTION

Halophosphate phosphors have been produced for some time. These have a wide range of colors ranging from the blue luminescence of a blue halo phosphor to the almost red-orange color of the warm white phosphor. The range in color in halophosphate phosphors is achieved by changing the formulation of the raw mix of the phosphor. While some colors, such as cool-white, warm-white and blue halo have been produced and sold for many years in the U.S., newer "cool" colors are desirable for particular markets such as South America. A conventional lamp available from Philips Lighting Company under the designation "Artic Brite" (also referred to as Arctic Bright) contains a two phosphor mix of about 84% Cool White phosphor (calcium halophosphate activated with manganese and antimony, color 35) and about 16% Blue Halo (calcium halophosphate activated with antimony only). However, due to the differences in color points for the phosphor produced, tests have indicated that a three-component blend is necessary to achieve the correct color when color 75 is desired.

Additionally, the biggest disadvantage with such multi-component phosphors is the difficulty in precise color reproduction. This difficulty is inherent to all multi-component mixtures and is the result of various factors including variations in the color points for the phosphors, variations in the intensities of the phosphors, differences in the UV absorption of the phosphors, heterogeneities in each phosphor lot, and variations in the particle size and morphology. Another disadvantage is the fact that the two phosphors must be blended. While this represents an added process step which adds to the cost of manufacturing, even more importantly, the act of blending results in some degree of mechanical damage to the phosphor. Mechanical damage results in the formation of crystal lattice defects, e.g., vacancies, or may result in overmilling of the particles and often in the formation of fines. Such damage adversely affects phosphor performance.

There is a continued need in the art for a cost-effective, single-component phosphor and ARTIC BRITE™ lamps derived therefrom.

SUMMARY OF THE INVENTION

An object of the invention is to provide a cost-effective, single-component ARTIC BRITE phosphor and lamps derived therefrom.

Another object of the invention is to provide a single-component ARTIC BRITE phosphor and lamps derived therefrom of a color suitable for special markets, and in especially preferred embodiments, having color coordinates on the CIE chromaticity diagram within a MacAdam four step oval centered on X=346 and Y=359, and an acceptable color rendering index ("CRI") value, preferably, a CRI value equal to at least 69, and preferably 75.

Yet another object is to provide a single component ARTIC BRITE phosphor and lamps derived therefrom in which low cost, mined calcium carbonate is used as a raw material and the amount of calcium pyrophosphate generated during processing is minimized.

Another object of the invention is to provide a method for the production of a single-component calcium halophosphate phosphor activated with antimony and manganese, and lamps derived therefrom, of a color suitable for special markets, and in especially preferred embodiments, having color coordinates on the CIE chromaticity diagram within a MacAdam four step oval centered on X=346 and Y=359, and an acceptable color rendering index ("CRI") value, preferably, a CRI value equal to at least 69, and preferably 75.

These and other objects of the invention are realized in the provision and utilization of at least one layer of a single-component Artic Brite calcium halophosphate phosphor, preferably having CIE color coordinates of X=346 and Y=359 and a CRI of at least 65, preferably 75. The phosphor is derived from a starting raw mix with a unique relative quantity of the components that allows for the desired luminescent color in the finished phosphor. In the phosphor of the invention, the host lattice has the formula $Ca_{10}X_2(PO_4)_6$ and the dopants fit in said lattice in the following ratios, in which the moles of the dopant reactants are based on six phosphate ions,: about 0.142 of manganese, preferably derived from manganese carbonate; about 0.904 of fluoride, preferably derived from calcium fluoride; about 0.146 of chloride, preferably derived from ammonium chloride; and about 0.602 of antimony, preferably derived from antimony oxide, respectively. Most preferably, the phosphor is a single-component phosphor of the formula:

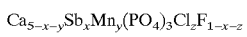

wherein x, y and z are integers as follows: x is from about 0.032 to 0.037; y is from about 0.06 to 0.14; and z is about 0.025 to 0.05. In particular, the invention is most preferably directed to a calcium chlorofluorophosphate phosphor activated by antimony and manganese having a CRI of 75 and selected from compounds having the formula:

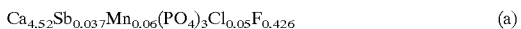     (a)

or

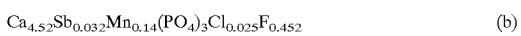     (b)

To produce ARTIC BRITE phosphor suitable for certain markets, for example, South American markets, it is also necessary to have a small particle phosphate for the synthesis of a fine-particle phosphor, and to use low-cost calcium carbonate, for example mined calcium carbonate, to be price-competitive. One of the disadvantages of using mined calcium carbonate is the relatively high concentration of sodium and other impurity elements that are normally present. Many of these IA or IIA alkali and alkaline earth metals tend to act as sintering aids and produce a "hard" phosphor cake that requires additional milling. It has been found that a high metals-to-phosphate (Ca+Mn) formulation helps to counteract this effect. A high metals-to-phosphate (Ca+Mn) ratio results in minimal calcium pyrophosphate, which is a non-luminescent secondary phase. It has also been found that minimizing the amount of calcium pyrophosphate formed can produce a "softer" cake. For these reasons, the phosphor and lamps of this invention also are derived from a formulation that employs a high metals-tophosphate (Ca+Mn) ratio of about 9.890 (based on six phosphate ions) to achieve a friable (readily crumbled) phosphor cake resulting in less fines formation with a tighter size distribution as shown by the number average particle size of 6.3 μm (compared to 1.9 for the conventional two-component phosphor used as the comparative phosphor standard herein and identified as M47M36). The final medium particle size is 10.44 μm. The invention also utilizes mined calcium carbonate as an inexpensive raw material.

According to the invention, a single-component ARTIC BRITE phosphor having an acceptable CRI is provided via a process that comprises the steps of:

(a) combining a source of phosphate, preferably dicalcium phosphate; a source of calcium, preferably calcium carbonate and especially mined calcium carbonate; a source of fluoride, preferably calcium fluoride; a source of chloride, preferably ammonium chloride; a source of manganese, preferably manganese carbonate; and a source of antimony, preferably antimony oxide; said components being present in a metals-to-phosphate (Ca+Mn) ratio of about 9.890 (based on six phosphate atoms) and in which, preferably the moles of the reactants, based on six phosphate ions, are about 0.142 manganese, preferably derived from manganese carbonate, about 0.904 fluoride, preferably derived from calcium fluoride, about 0.146 chloride, preferably derived from ammonium chloride, and about 0.062 antimony, preferably derived from antimony oxide, respectively;

(b) firing the mixture at a temperature to form a friable calcium halophosphate phosphor activated with antimony and manganese, preferably having the formula

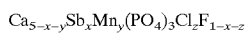

wherein x, y and z are integers as follows: x is from about 0.032 to 0.037; y is from about 0.06 to 0.14; and z is about 0.025 to 0.05, and especially being a calcium chlorofluorophosphate phosphor activated by antimony and manganese and selected from compounds having the formula:

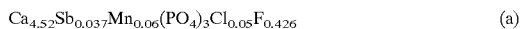  (a)

or

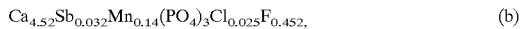  (b)

preferably with a medium particle size of about 9.5 to 11 μm, preferably about 10.5 μm and a CRI of about 75.

The method of the invention eliminates the conventional processing steps of blending two or more phosphors together to produce the final desired color. The single-component phosphor of the invention eliminates or obviates as much as possible the problems associated with multi-component phosphors discussed above, and provides in particular color homogeneity and precise color reproduction. Brightness and lumen maintenance are slightly higher for the single-component phosphor than for two-component phosphors such as, for example, M47M36. The phosphor of the invention is useful in fluorescent lamps, such as for example, 40WT12. An electric lamp according to the invention comprises a lamp envelope having an inner surface and means within the lamp envelope for generating ultraviolet radiation. A layer of the luminescent material comprising a single-component phosphor of the invention is adjacent the inner surface of the lamp envelope for generating visible light when impinged by the ultraviolet radiation. The lamp may include, if desired, a second layer, between the inner surface of the lamp envelope and the layer of luminescent material, for reflecting ultraviolet radiation which has passed through the layer of luminescent material back into said luminescent material for increasing the visible light output of the luminescent material.

BRIEF DESCRIPTION OF THE DRAWINGS

FIG. 5 is a table showing various formulations for the starting mix; and

FIG. 6 is a table comparing properties of lamps using phosphors derived from the formulations listed in FIG. 5 compared to a two-component phosphor.

DETAILED DESCRIPTION OF PREFERRED EMBODIMENTS

Figure 1:
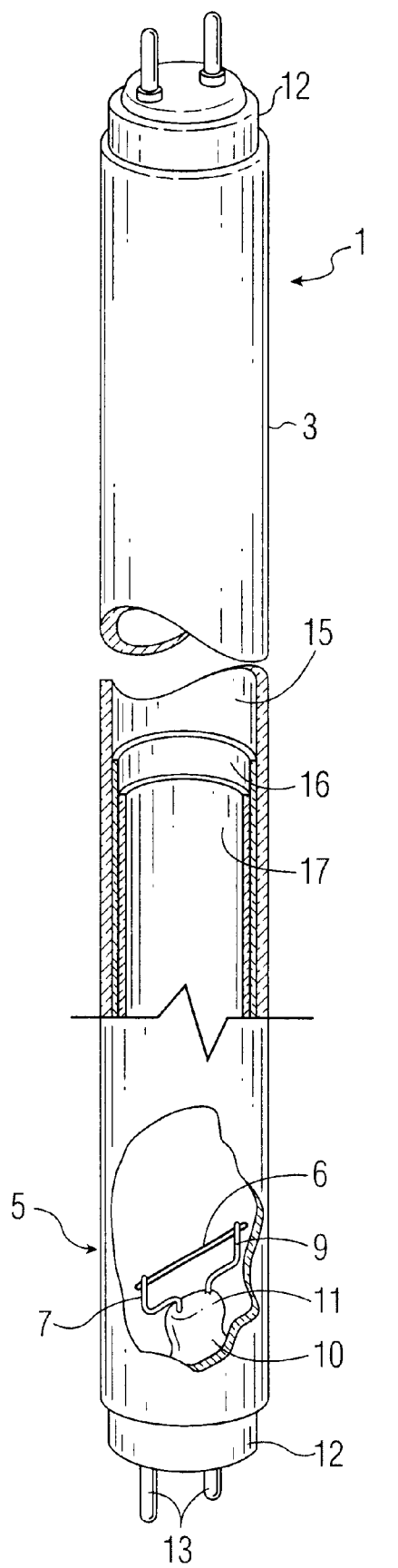
FIG. 1 is a perspective view of a fluorescent lamp, partly in cross-section, partly broken away, having a phosphor according to the invention.

FIG. 1 illustrates a low-pressure mercury vapor fluorescent lamp 1 with an elongated outer envelope, or bulb, 3. The lamp includes a conventional electrode structure 5 at each end which includes a filament 6 supported on in-lead wires 7 and 9 which extend through a glass press seal 11 in the mount stem 10. The leads 7,9 are connected to the pin-shaped contacts 13 of their respective bases 12 fixed at opposite ends of the lamp. The discharge-sustaining filling includes an inert gas such as argon, or a mixture of argon and other gases, at a low pressure in combination with a small quantity of mercury to sustain an arc discharge during lamp operation. Optionally, the inner surface 15 of the outer envelope 3 may be provided with an undercoat 16 of gamma alumina. A phosphor coating 17 is disposed over the undercoat 16. Preferably, both coatings extend the full length of the bulb, completely circumferentially around the bulb inner wall.

The starting materials for the phosphors of the invention are preferably calcium phosphate, calcium carbonate, calcium fluoride, manganese carbonate, antimony trioxide, and ammonium chloride employed in amounts sufficient to provide various molar ratios of reactants as set forth above.

Figure 2:
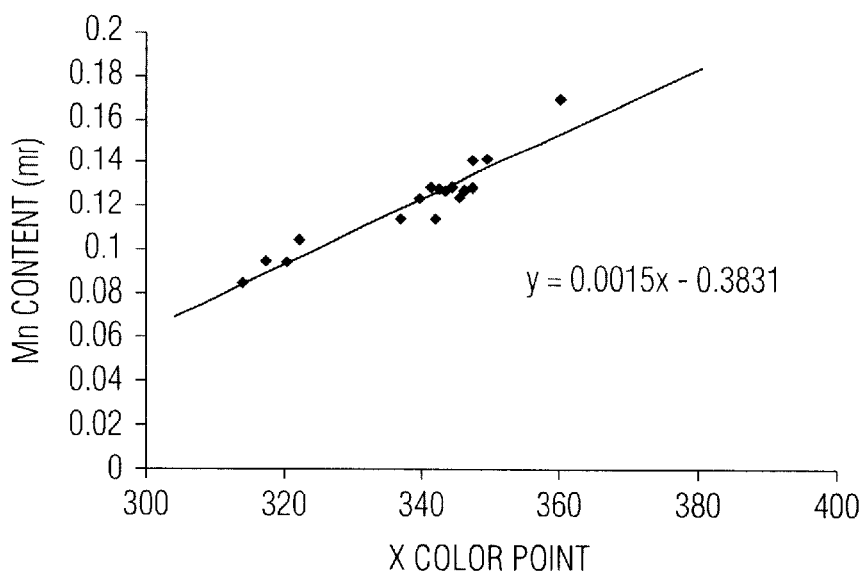
FIG. 2 is a graph illustrating the X color point and the Mn content in a starting mix.

With reference to FIG. 5, Formulations 78-1 to 84-5 and T-85, were prepared as single trays using a lab-scale double cone blender. Some formulations were made using laboratory-produced calcium carbonate ("Bath Ca"), and some were made with mined calcium carbonate ("mined Ca). One interesting aspect revealed by data from a study of the properties of the various formulations is the rather linear relationship between the X-color point and the Mn concentration in the starting mix. The graph of this relationship is given in FIG. 2.

A preferred formulation of this invention T-85 was mixed in the indicated mole ratios based on 6 phosphorous ions using low-cost mined calcium carbonate for reduced cost and high metals-to-phosphate (Ca+Mn) ratios to minimize fines formation and non-luminescent pyrophosphate secondary phase formation.

Trays of the various formulations were fired in factory furnaces at a temperature of about 1180 to 1185° C. After firing, the trays were allowed to cool, and were then subjected to further processing during which the cakes were crushed and hammermilled. Powder plaque brightness and color points were measured, and antimony content was determined by EDTA titration. When a sample with acceptable color points was identified (T85), it was evaluated for lamp powder weight series. A sample of M4736 two-component phosphor derived from cool white and blue halo described above was employed as a comparative standard.

The width of the size distribution is expressed herein in terms of the quartile distribution ($Q_d$) which relies on a symmetric distribution of sizes for a fair comparison. The relationship for the calculation of $Q_d$ is $$Q_d = (d_{75} - d_{25})/(d_{75} + d_{25})$$

where $d_{75}$ is the particle size at 75% cumulative and $d_{25}$ is the particle size at 25% cumulative.

Table I below is a comparison of the particle size of the single-component phosphor of this invention T-85 and the two-component phosphor M4736, where d50 is the medium particle size, Qd is the quartile distribution, mv is the volume average particle size, and mn is the number average particle size. All of the numbers are in microns ($10^{-6}$ m).

TABLE I

| Sample | d10 | d25 | d50 | d75 | d90 | Qd(75/25) | mv | mn |
|---|---|---|---|---|---|---|---|---|
| M4736 | 5.500 | 7.761 | 10.31 | 13.50 | 17.23 | 0.2699 | 10.96 | 1.942 |
| T-85 | 6.216 | 8.014 | 10.44 | 13.64 | 17.50 | 0.2598 | 11.33 | 6.312 |

It can be seen that while the medium particle size (d50) and volume average particle size (mv) are close to the same, the number average particle size (mn) for the two-component phosphor is much lower, indicating a significant fines tail. The lack of fines tail for the T-85 single-component phosphor sample of the invention is attributed to the "soft" cake obtained with the high metals-to-phosphate (Ca+Mn) formulation and the absence of additional blending of the two phosphors (cool-white and blue halo).

Table II is a comparison of powder plaque photometric quantities measured and the antimony content for the single-component phosphor of this invention, and the two-component phosphor M4736. In the Table, $R_{254}$ is the 254-nm UV reflectance and QE is the quantum efficiency. The quantum efficiency is the brightness normalized for absorption (the inverse of reflectivity), that is the amount of luminance relative to the amount of 254 nm absorbed by the plaque. The Lamp X and Lamp Y values are average values from argon-filled 40W-T12 lamps after 100 hours of burn time.

TABLE II

| Sample | % Sb | Brightness | X | Y | $R_{254}$ | QE | Lamp X | Lamp Y |
|---|---|---|---|---|---|---|---|---|
| M4736 | 0.79 | 100.4 | 343.5 | 361.8 | 15.8 | 101.0 | 346.1 | 363.9 |
| T-85 | 0.78 | 101.5 | 343.7 | 364.9 | 16.4 | 102.8 | 349.9 | 368.8 |

It should be noted that although both the plaque brightness and quantum efficiency numbers are higher for the T-85 phosphor, the Y color point by plaque photometry is about 3 blocks higher for T-85. It should also be noted that the disparity in the color points is greater in the lamp than for the powder plaque.

Figure 3:
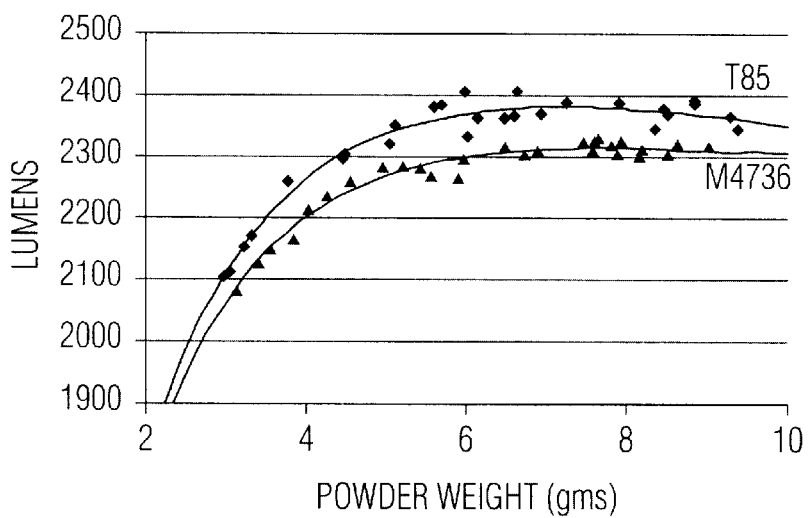
FIG. 3 is a graph comparing the 100-hour lamp lumens powder weight for a single-component phosphor of the invention with a two-component phosphor.
Figure 4:
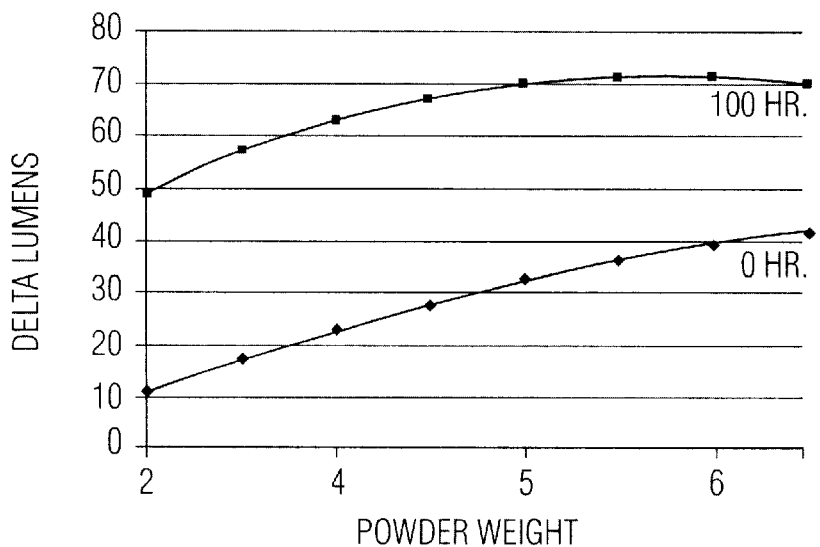
FIG. 4 is a graph comparing the difference in brightness levels of a single-component phosphor of the invention with a two-component phosphor.

To determine the relative efficiency of the phosphor at a range of powder weights, a powder weight series was run. The phosphor showed no dispersibility problems and poured lamps showed no texture problems. As indicated further hereinbelow, when the phosphors thus produced were tested in 40WT12 bulbs, the K and Y color points of the phosphor of the invention were found to be acceptable and suitable for special markets. A graph of the powder weight curves, see FIG. 3, compares the 100-hr. lamp lumens powder weight series for the T-85 phosphor and the two-component M4736 in 40WT12 argon-filled bulbs while FIG. 4 illustrates the difference in the brightness levels calculated as a "delta lumens" for both 0 and 100 hours. As illustrated by the graphs, the phosphor and lamps of the invention showed an improvement over the two-component phosphor and lamps of as much as 50 delta lumens at as little as 3.0 grams and as much as 70 lumens at only 5.0 grams for 100 hours. In addition, the phosphor showed no dispersibility or texture problems. These data indicate These data indicate that the single-component phosphor is brighter than the two-component phosphor. These data also indicate that the lumen maintenance is improved in the T-85 phosphor. While not wishing to be bound by any particular theory, it is believed that the difference in brightness may be the result of one or more of the following factors regarding the T-85 phosphor of the invention: (a) the higher Y color (about 5 blocks); (b) less fines fraction in the particle size; and (c) the higher metals-to-phosphate (Ca+Mn) formulation. Higher antimony levels in halophosphate phosphors tend to result in higher UV absorption, which can lead to increased brightness and to better lamp phosphor maintenance over time. However, no significant difference in antimony concentration was detected in the two-component and single-component phosphor, and the reflectance is, in fact, higher for the T-85 phosphor. The tests indicate that the use of mined calcium carbonate has no effect on either color or brightness of the phosphor and can be used to produce inexpensive, lamps according to the invention.

While this invention has been described with reference to the illustrative embodiments, it will be appreciated by those skilled in the art that in the drawings and specification, there have been disclosed typical preferred embodiments of the invention and, although specific terms are employed, they are not used for purposes of limitation, the scope of the invention being set forth in the appended claims.

I claim:

1. A method for producing a single-component calcium halophosphate phosphor having an CRI of at least 69 which comprises the steps of:
    (a) combining a source of phosphate, a source of calcium, a source of fluoride, a source of chloride, a source of manganese, and a source of antimony materials, wherein
    the said materials are combined in a metals-to-phosphate (Ca+Mn) ratio of about 9.890 (based on six phosphate ions), and
    the moles of the materials, based on six phosphate ions, are about 0.142 manganese, about 0.904 calcium, about 0.146 chloride, and about 0.062 antimony, respectively;
    (b) firing the mixture of combined materials at a temperature to form a friable calcium halophosphate phosphor activated with antimony and manganese.

2. A method as claimed in claim 1 wherein the calcium halophosphate has the formula

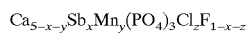

wherein x, y and z are integers as follows: x is from about 0.032 to 0.037; y is from about 0.06 to 0.14; and z is about 0.025 to 0.05.

3. A method as claimed in claim 1 wherein the calcium halophosphate is a calcium chlorofluorophosphate phosphor activated by antimony and manganese and selected from compounds having the formula:

$$Ca_{4.52}Sb_{0.037}Mn_{0.06}(PO_4)_3Cl_{0.05}F_{0.426} \quad (a)$$

and $$Ca_{4.52}Sb_{0.032}Mn_{0.14}(PO_4)_3Cl_{0.025}F_{0.452}. \quad (b)$$

4. A method as claimed in claim 1 wherein the friable calcium halophosphate phosphor is subjected to a size reduction step to yield a phosphor having a medium particle size of about 9.5 to 11 $\mu$m and a CRI of about 75.

5. A method for the production of a single-component phosphor having an CRI of at least 69 which comprises the steps of:
  combining dicalcium phosphate, calcium carbonate, calcium fluoride, ammonium chloride, manganese carbonate; and antimony oxide;
  wherein said materials are present in a metals-to-phosphate (Ca+Mn) ratio of about 9.890 (based on six phosphate ions) and the moles of the reactants, based on six phosphate ions, are about 0.142 manganese, about 0.904 fluoride, about 0.146 chloride, and about 0.062 antimony, and about 6 moles dicalcium phosphate, respectively;
  (b) firing the mixture at a temperature to form a friable calcium halophosphate phosphor activated with antimony and manganese, preferably having the formula $$Ca_{5-x-y}Sb_xMn_y(PO_4)_3Cl_zF_{1-x-z}$$

wherein x, y and z are integers as follows: x is from about 0.032 to 0.037; y is from about 0.06 to 0.14; and z is about 0.025 to 0.05.

6. A method as claimed in claim 5 wherein the phosphor is a calcium chlorofluorophosphate phosphor activated by antimony and manganese and selected from compounds having the formula:

$$Ca_{4.52}Sb_{0.037}Mn_{0.06}(PO_4)_3Cl_{0.05}F_{0.426} \quad (a)$$

and $$Ca_{4.52}Sb_{0.032}Mn_{0.14}(PO_4)_3Cl_{0.025}F_{0.452}. \quad (b)$$

7. A method as claimed in claim 5 wherein the friable calcium halophosphate phosphor is subjected to a size reduction step to yield a phosphor having a number average particle size of about 9.5 to 11 $\mu$m and a CRI of about 75.

8. A method as claimed in claim 6 wherein the friable calcium halophosphate phosphor is subjected to a size reduction step to yield a phosphor having a number average particle size of about 6.3 $\mu$m and a CRI of about 75.

9. A method as claimed in claim 5 wherein the calcium carbonate is mined calcium carbonate.

* * * * *